United States Patent
Riess et al.

(10) Patent No.: US 9,682,382 B2
(45) Date of Patent: Jun. 20, 2017

(54) METHOD FOR PROCESSING GLASS FIBER WASTE

(71) Applicant: QUARZWERKE GMBH, Frechen (DE)

(72) Inventors: Michael Riess, Kerpen (DE); Jörg Ulrich Zilles, Köln (DE); Nicola Panic, Kerpen (DE)

(73) Assignee: QUARZWERKE GMBH, Frechen (DE)

( * ) Notice: Subject to any disclaimer, the term of this patent is extended or adjusted under 35 U.S.C. 154(b) by 305 days.

(21) Appl. No.: 14/367,211

(22) PCT Filed: Dec. 17, 2012

(86) PCT No.: PCT/EP2012/075744
§ 371 (c)(1),
(2) Date: Jun. 19, 2014

(87) PCT Pub. No.: WO2013/092471
PCT Pub. Date: Jun. 27, 2013

(65) Prior Publication Data
US 2015/0017438 A1    Jan. 15, 2015

(30) Foreign Application Priority Data
Dec. 19, 2011   (EP) .................. 11194310

(51) Int. Cl.
*B02C 23/06* (2006.01)
*B02C 19/00* (2006.01)
*C03B 37/16* (2006.01)

(52) U.S. Cl.
CPC .......... *B02C 23/06* (2013.01); *B02C 19/0056* (2013.01); *B02C 19/0087* (2013.01); *C03B 37/16* (2013.01); *B02C 19/0068* (2013.01); *Y02P 40/57* (2015.11); *Y10T 428/2927* (2015.01)

(58) Field of Classification Search
CPC ............... B02C 23/06; B02C 19/0056; B02C 19/0087; B02C 19/0068
USPC ............................................. 241/22, 29, 99
See application file for complete search history.

(56) References Cited

U.S. PATENT DOCUMENTS

| | | | |
|---|---|---|---|
| 6,029,477 A | 2/2000 | Hanvey, Jr. | |
| 6,032,883 A | 3/2000 | Hansen | |
| 6,776,838 B2 * | 8/2004 | Hemmings | ............ C03C 3/087 106/711 |
| 7,605,098 B2 * | 10/2009 | Hemmings | ............ C03C 3/087 106/716 |

(Continued)

FOREIGN PATENT DOCUMENTS

| | | |
|---|---|---|
| CN | 102329065 A | 1/2012 |
| CN | 102482140 A | 5/2012 |
| EP | 2 471 756 A1 | 7/2012 |

OTHER PUBLICATIONS

International Preliminary Report on Patentability (including Written Opinion) issued in PCT Application No. PCT/EP2012/075744 dated Jun. 24, 2014.

*Primary Examiner* — Faye Francis
(74) *Attorney, Agent, or Firm* — Venable LLP; Lars H. Genieser

(57) ABSTRACT

The present invention relates to a process for comminuting glass fibers from waste glass-based fibrous materials.

19 Claims, 2 Drawing Sheets

(56) References Cited

U.S. PATENT DOCUMENTS

| | | | |
|---|---|---|---|
| 7,811,377 B2* | 10/2010 | Hemmings | C03C 3/087 106/484 |
| 2007/0042890 A1 | 2/2007 | Hemmings et al. | |
| 2011/0272507 A1* | 11/2011 | Medoff | C08J 5/24 241/29 |

* cited by examiner

METHOD FOR PROCESSING GLASS FIBER WASTE

This application is a U.S. National Stage of International Application No. PCT/EP2012/075744, filed Dec. 17, 2012, which claims the benefit of European Patent Application No. 11194310.6, filed Dec. 19, 2011, the specifications of which are hereby incorporated by reference in their entirety.

FIELD OF THE INVENTION

The present invention relates to a process for comminuting glass fibers from waste glass-based fibrous materials, and to the use of an additive as an aggregate in a media mill for comminuting glass fibers.

BACKGROUND OF THE INVENTION

In production of glass fibers, significant amounts of waste glass-based fibrous materials are formed in production steps performed. These waste glass-based fibrous materials mainly consist of long fibers, usually having lengths within a range of 5 to 10 m.

US 2007/0042890 describes a process in which fibers are coarsely cut at first and then ground in a ball mill.

U.S. Pat. No. 6,032,883 describes a process for processing glass fibers in which glass fibers are mixed with small amounts of glass powder, broken glass or water.

SUMMARY OF THE INVENTION

In a process according to the present invention, glass fibers from waste glass-based fibrous materials are comminuted by coarsely comminuting the glass fibers to obtain coarsely comminuted glass fibers, and finely comminuting said coarsely comminuted glass fibers with a granular additive having a d50 value within a range of from 0.1 to 5.0 mm as an aggregate to obtain finely comminuted glass fibers, the mixing ratio of glass fibers to additive being from 25/75 to 95/05 by weight. For example, the granular additive can be quartz sand, lime, burnt lime, dolomite, burnt dolomite, blast furnace slag, $Al_2O_3$, aluminum hydroxide, albite, orthoclase, anorthite, boric acid, boron oxide, alkali borates, alkaline earth borates, or mixtures. The coarsely comminuting or grinding can include 1, 2, 3, or more steps. For example, the coarsely comminuting or grinding can be performed with a cutting mill, a guillotine cutter, an attrition wheel, a toothed roller mill, a hammermill, a pinned disk mill, an impact mill, or a combination. For example, the finely comminuting or grinding can be performed in a mill, for example, a media mill. The media mill can be a ball mill, a tumbling mill, a drum mill, or a tube mill. After finely comminuting or grinding the grinding media can be subsequently separated out. For example, coarsely comminuted glass fibers having a length of 5 to 50 mm, for example, having a length of 10 to 20 mm, can be obtained in the coarsely comminuting or grinding step. The coarsely comminuted glass fibers can have a residual moisture content of <(less than) 5% by weight, preferably <(less than) 2.5% by weight. For example, finely comminuted glass fibers having a length of <(less than) 2 mm, preferably <(less than) 1 mm, can be obtained in the finely comminuting or grinding step. The mixture of finely comminuted glass fibers and additive can be subjected to sifting. The mixing ratio of glass fibers to the additive can be 30/70 to 80/20 by weight, 40/60 to 70/30 by weight, 40/60 to 60/40 by weight, or 45/55 to 55/45 by weight. Additives having a d50 value within a range of from 0.1 to 1.5 mm, for example, from 0.3 to 1.0 mm, can be used. A mixture containing glass fibers can be obtained by such a process.

An additive such as quartz sand, lime, burnt lime, dolomite, burnt dolomite, blast furnace slag, $Al_2O_3$, aluminum hydroxide, albite, orthoclase, anorthite, boric acid, boron oxide, alkali borates, alkaline earth borates, or mixtures thereof as an aggregate at a ratio of 25/75 to 95/05 by weight, for example, 30/70 to 80/20 by weight (glass fibers to additive), can be used to comminute glass fibers.

In an embodiment according to the present invention, a mixture containing, including, comprising, or consisting of glass fibers, can contain, include, comprise, or consist of the following: finely comminuted glass fibers having a length of <(less than) 2 mm; and an additive having a d50 value within a range of from 5.0 μm to 5.0 mm. The mixing ratio of glass fibers to additive can be from 25/75 to 95/05 by weight, or from 30/70 to 80/20 by weight. The additive can have a d50 value of from 5.0 μm to 2 mm.

DETAILED DESCRIPTION

Figure 1:
FIG. 1 shows glass fiber balls as obtained as a waste material.

Embodiments of the invention are discussed in detail below. In describing embodiments, specific terminology is employed for the sake of clarity. However, the invention is not intended to be limited to the specific terminology so selected. A person skilled in the relevant art will recognize that other equivalent parts can be employed and other methods developed without parting from the spirit and scope of the invention. All references cited herein are incorporated by reference in their entirety as if each had been individually incorporated.

In preliminary experiments for the processing of glass fibers, it was found that direct comminution to the desired target length using suitable cutting tools has a highly wearing effect on such tools. In addition, the glass fibers are contaminated with the particles abraded from the tools thereby.

Further, grinding experiments with the fibers have shown that the fibers basically tend to clot together. This produces woolly aggregates of the glass fibers, which significantly reduce the grinding performance of a mill, so that an efficient comminution of the material to be ground or of the glass fibers is no longer possible.

According to the present invention a process enables waste glass-based fibrous materials to be reused.

This process comminutes glass fibers from waste glass-based fibrous materials, comprising the process steps of
 a) coarsely comminuting the glass fibers to obtain coarsely comminuted glass fibers; and
 b) finely comminuting said coarsely comminuted glass fibers with a granular additive having a d50 value within a range of from 0.1 to 5.0 mm as an aggregate to obtain finely comminuted glass fibers, the mixing ratio of glass fibers to additive being from 25/75 to 95/05 by weight.

The process yields a mixture containing glass fibers.

An additive is used that remains in the material.

The glass fibers employed can be both coated and uncoated glass fibers. For example, coated glass fibers are glass fibers having an aminosilane coating.

If the waste glass-based fibrous materials have a high residual moisture content of, for example, ≥6% by weight, a drying step may be performed, preferably after said coarsely comminuting of the glass fibers and before the process step of finely comminuting said coarsely comminuted glass fibers. Suitable drying devices are known to the skilled person from the prior art. Thus, for example, the coarsely comminuted glass fibers can be dried with a temperature-controlled air blower.

The waste glass-based fibrous materials, which are obtained during glass fiber production, are coarsely comminuted by means of suitable cutting devices in a first step, step a). For example, a loose bulk of the waste glass-based fibrous materials is loaded onto the suitable cutting device in an uncontrolled way, for example, from a container with waste glass-based fibrous materials. Alternatively, the waste glass-based fibrous materials may also be unwound from a bobbin or directly drawn from the glass melt and supplied to the cutting device.

The present process is particularly suitable for so-called random fibers, i.e., balls of glass fibers without a specific orientation.

The step of coarsely comminuting can be performed by means of a cutting mill, a guillotine cutter, an attrition wheel, a toothed roller mill, a hammermill, a pinned disk mill or an impact mill. Attrition wheels are also known under the designation of friction or frictional wheels. In some cases, it is useful to perform two or more coarse comminution steps successively.

In embodiments in which two coarse comminution steps are used, it may be useful to comminute only down to fiber lengths of 10 to 100 cm in the first step, followed by one or more runs for the further coarse comminution.

Preferably, coarsely comminuted glass fibers having an average length of 5 to 50 mm, preferably 5 to 35 mm, more preferably 10 to 20 mm, are obtained in process step a). The exact length depends on the type of coarse comminution device employed. A guillotine cutter yields rather uniform lengths, while attrition wheels or toothed roller mills yield less uniform lengths. The coarse comminution reduces clotting in the subsequent process step of finely comminuting.

The coarsely comminuted glass fibers can have a residual moisture content of <5% by preferably <2.5% by weight, for example <1.5% by weight. Thus, it was found that a mixture of coarsely comminuted glass fibers and additive in the media mill, wherein the glass fibers still have a residual moisture content of more than 5% by weight, results in clotting and thus to a reduction of the fine comminution rate. The moisture content that results in a reduction of the fine comminution rate depends on the type of device.

In a second process step, step b), the coarsely comminuted glass fibers are mixed with a suitable granular additive having a d50 value within a range of from 0.1 to 5.0 mm as an aggregate. A d50 value within a range of from 0.1 to 2.0 mm is particularly preferred. The thus obtained mixture of glass fibers/additive is then exposed to the action of a mechanical force the some time. A mixture of finely comminuted glass fibers and additive is thereby obtained, which may again be supplied to a melt.

Thus, according to the invention, the added additive remains in the finely comminuted glass fibers, which are commonly introduced in a production process. As a rule, the additive is also comminuted thereby.

Granular additives according to the invention are those which are in a solid state of matter under normal conditions and preferably consist of generally spherical particles.

Preferably, the surface of the granular additive has sharp edges, i.e., at least two legs of the granular additive intersect in an acute angle in a cross-sectional view.

The additive can be selected from the group of quartz sand, lime, burnt lime, dolomite, burnt dolomite, blast furnace slag, $Al_2O_3$, aluminum hydroxide, albite, orthoclase, anorthite, boric acid, boron oxide, alkali and alkaline earth borates, and mixtures thereof. Thus, depending on the melt for which the glass fiber is processed according to the invention, the suitable additive can be used as an aggregate for finely comminuting the coarsely comminuted glass fibers.

Alternatively or as a complement, other ingredients known to the skilled person that are employed in glass production may also be employed as additives. Sodium carbonate, potash, feldspar or used glass, for example, so-called cutlet from production, are known to the skilled person. These additives too can be granular.

The use of $Al_2O_3$ or used glasses can lead to undesirably high sodium contents because of the high sodium content of the cutlet.

In a particularly preferred embodiment, additives having a d50 value within a range of from 0.1 to 2 mm or from 0.1 to 1.5 mm, preferably within a range of from 0.3 to 1.0 mm, are used. It has been found that an additive having a higher d50 value (see Example 2) is better in comminuting the coarsely comminuted glass fibers into pieces of appropriate size. Without being bound by theory, it is believed that an additive having a higher d50 value will pulverize the material to be ground by the pressure exerted by the grinding media in the mill, for example, d50 means the particle size for which 50% by weight of the particles have a particle size smaller than the d50 value, and 50% by weight have a particle size greater than the d50 value. Such values can be derived from grading curves.

Generally, it was found that the smallest possible d50 value of the additive depends on the hardness of the additive. Experiments demonstrate that the lower the Mohs hardness of the additive, the higher the d50 value of the additive must be to optimally comminute the coarsely comminuted glass fiber. Thus, the higher the d50 value of the additive, the longer is the duration of grinding in the second process step, i.e., step b).

The fine comminution can be performed in a mill. The mixture of glass fiber/additive loaded into the mill is finely comminuted over a defined grinding time.

In principle, all mills known to the skilled person are suitable.

The fine comminution can be performed in a media mill. Suitable media mills include a ball mill, a tumbling mill, a drum mill, or a tube mill. Unlike the additive, the grinding media are removed after grinding.

Suitable mixing ratios of glass fibers to the additive can be 30/70 by weight or more, or 40/60 or more, or 45/55 by weight or more. The upper limit can be 95/05 or 80/20 by weight, such as 70/30, 60/40 or 55/45. For example, the mixing ration can be 30/70 to 80/20 by weight.

Different mixing ratios have an effect on the duration of grinding and on the product produced by the process.

Finely comminuted glass fibers having a length of <2 mm, for example, <1 mm, can be obtained in step b). Fine comminution to below 0.1 mm may not be necessary.

In an embodiment, the mixture of finely comminuted glass fibers and additive is subjected to sifting. Suitable sifters are known to the skilled person from the prior art.

If sifting is performed, the separated oversize can be recycled to increase the yield of the fine grain.

Basically, a product flow equilibrium is established because of the recycling into the process. The supply rate, at which coarsely comminuted fibers and additives are introduced into the process, determines the dwelling times. If too much material is directed into the process, the product becomes coarser grained, and the selectivity of the sifter deteriorates. In extreme cases, obstructions may occur.

If a media mill is used, the filling level of the mill with grinding bails is another variable; the more grinding balls there are, the higher is the grinding intensity.

The separation in an air separator can he determined by the number of revolutions of the fans employed. Typically, the separation is effected by two countercurrent or orthogonally flowing air streams. The numbers of revolutions determine the separating grain size.

Alternatively, the mixture of finely comminuted glass fibers and additive can be screened through a screen having a mesh within a range of from <2.5 to 0.5 mm, more preferably within a range of from <2 to 1 mm, before sifting in order to remove larger fragments.

The present invention also relates to the use of an additive selected from the group of quartz sand, lime, burnt lime, dolomite, burnt dolomite, blast furnace slag, $Al_2O_3$, aluminum hydroxide, albite, orthoclase, anorthite, boric acid, boron oxide, alkali and alkaline earth borates, and mixtures thereof as an aggregate at a ratio of 25/75 to 95/05 (glass fibers to additive) for comminuting glass fibers.

The present invention further relates to the glass fibers obtainable by the process according to the invention, and to a mixture containing glass fibers, containing:
  finely comminuted glass fibers having a length of <2 mm;
  an additive having a d50 value within a range of from 5.0 μm to 5.0 mm, the mixing ratio of glass fibers to additive being from 25/75 to 95/05 by weight.

Since the additive may also be comminuted in the fine comminution step, the additive has a smaller grain size in the product as compared to the starting materials of the process.

Figure 2:
FIG. 2 shows a photograph of fibers having been subjected to a first coarse comminuting step. These have lengths within a range of about from 20 to 100 cm.

FIG. 1 shows glass fiber balls as obtained as a waste material,

FIG. 2 shows a photograph of fibers having been subjected to a first coarse comminution step. These have, lengths within a range of about from 20 to 100 cm.

Figure 3:
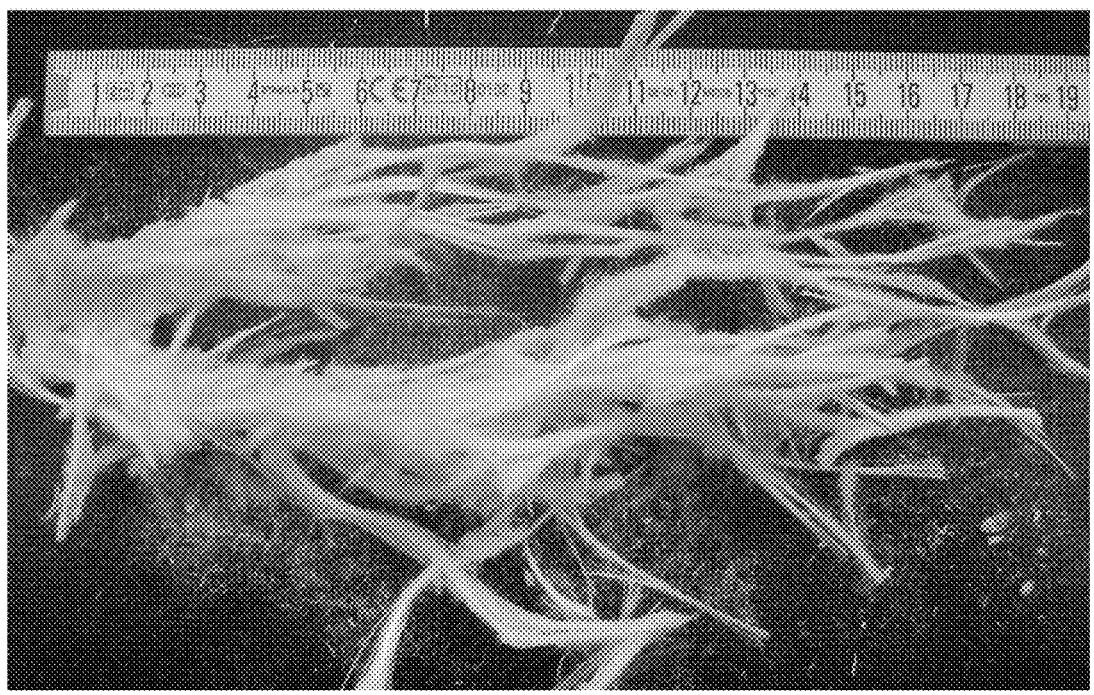
FIG. 3 shows fibers having been subjected to a second coarse comminuting step. The fiber length is about from 0.5 to 10 cm.

FIG. 3 shows fibers having been subjected to a second coarse comminution step. The fiber length is about from 0.5 to 10 cm.

Figure 4:
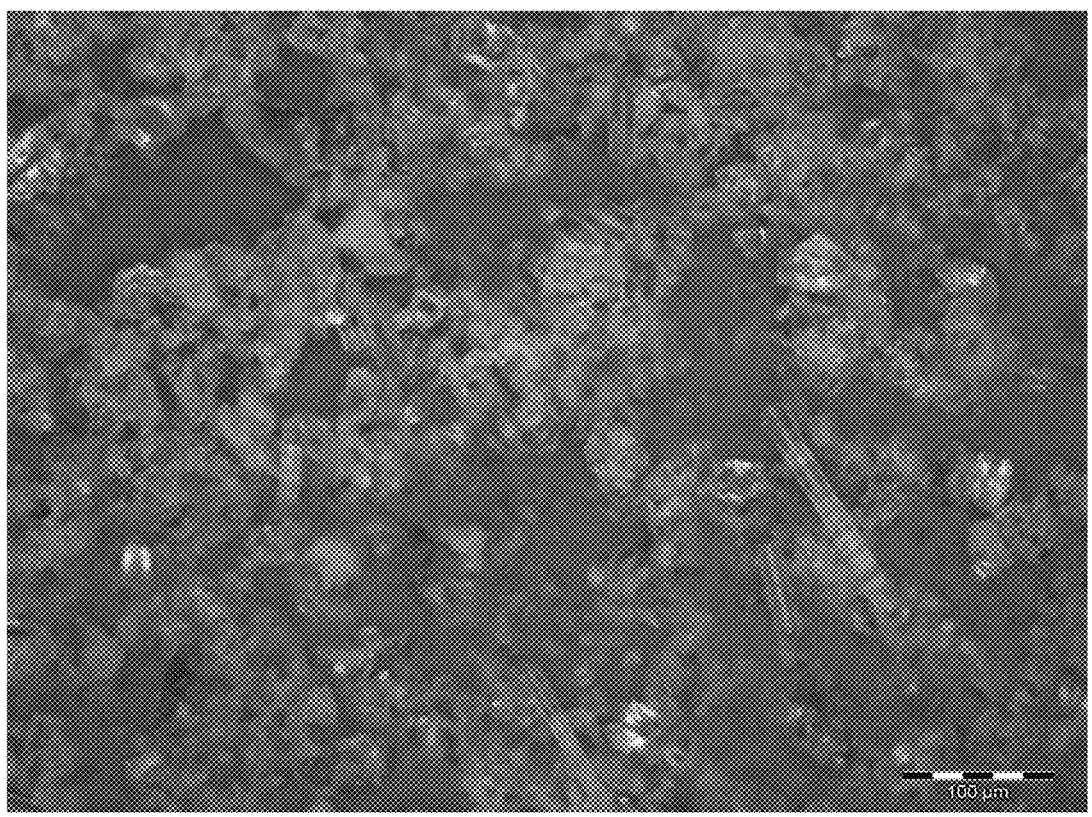
FIG. 4 shows a micrograph taken after fine comminuting. In addition to the glass fibers, the ground additive is also a component of the material.

FIG. 4 shows a micrograph taken after fine comminution. In addition to the glass fibers, the ground additive is also a component of the material.

EXAMPLE 1

Coarse Comminution:
Waste glass-based fibrous materials having a length within a range of from 5 to 10 in was coarsely comminuted by means of a high performance guillotine cutting machine to a length of from 10 to 20 mm. The $Fe_2O_3$ content remained unchanged.

Fine Comminution:
The coarsely comminuted glass fibers were finely comminuted in a 20 kg batch bail mill with quartz sand (Provodin foundry sand).

| Experiment | Glass fiber content [%] | Grinding time [min] | Loading amount [kg] | Fiber length [mm] |
|---|---|---|---|---|
| 1 | 50 | 45 | 20 | 0.3 |
| 2 | 50 | 20 | 12 | 0.3 |
| 3 | 60 | 10 | 12 | <1.5 |
| 4 | 70 | 10 | 12 | <2 |

Sifting:
The finely comminuted glass fibers and the additive were sifted with a separator. An air flow rate of 165 l/min and a rotation of the classifying wheel of 2000 rpm were set. The mass ratio of undersize to oversize in the first separator run was 1:7.5. The fiber length obtained in the undersize was <1 mm.

EXAMPLE 2

Two grinding attempts with a 20 kg batch ball mill were performed, the present grinding attempt being set forth with china clay as a comparative example.

|  | Lime | China clay |
|---|---|---|
| Proportion of additive [%] | 50 | 50 |
| Proportion of glass fiber [%] | 50 | 50 |
| Additive - d50 | 1.8 mm | 2.4 μm |
| Grain size | 1.4 to 2.5 mm | 35% < 2 μm |
| Loading of mill [kg] | 12 | 12 |
| Grinding time [min] | 10 | 10 |

When china clay was added as an additive to the glass fiber grinding batch, the comminution of the glass fibers was completely suppressed. A mixing of the two components could not he achieved. The glass fibers assembled to clots over the grinding time, which were externally dusted with china clay dust, but internally contained exclusively glass fibers.

With granular lime, a grinding success was obtained over the grinding time, In this case, no fiber balls could be identified in the ground material. The fiber length was <2 mm; the mixture obtained was highly suitable as a starting material for glass production.

EXAMPLE 3

A continuous grinding attempt was made with a ball mill having a throughput of 100 kg/h, The glass fiber and additive (quartz sand according to Example 1) were employed at a ratio of 50/50. The grain size of the additive was 0.18 to 1.4 mm, and the d50 value was 0.55 mm; the grinding ball filling level was 40% of the mill volume. The subsequent sifting was effected with a rotor at 900 rpm and a fan at 800 rpm. The oversize was recycled.

The continuously removed grain had a fiber length of <500 μm, and the product had a d50 value of 14.5 μm. The following oversize proportions were obtained:

| Screen size [μm] | Oversize proportion [%] |
|---|---|
| 160 | 0.25 |
| 125 | 0.8 |

| Screen size [μm] | Oversize proportion [%] |
| --- | --- |
| 100 | 2.0 |
| 63 | 9.2 |
| 40 | 20 |

The embodiments illustrated and discussed in this specification are intended only to teach those skilled in the art the best way known to the inventors to make and use the invention. Nothing in this specification should he considered as limiting the scope of the present invention, All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

The invention claimed is:

1. A process for comminuting glass fibers from waste glass-based fibrous materials, comprising the process steps of
 a) coarsely comminuting the glass fibers to obtain coarsely comminuted glass fibers; and
 b) finely comminuting said coarsely comminuted glass fibers with a granular additive having a d50 value within a range of from 0.1 to 5.0 mm as an aggregate to obtain finely comminuted glass fibers, the mixing ratio of glass fibers to additive being from 25/75 to 95/05 by weight,
  wherein the additive is selected from the group of quartz sand, lime, burnt lime, dolomite, burnt dolomite, blast furnace slag, $Al_2O_3$, aluminum hydroxide, albite, orthoclase, anorthite, boric acid, boron oxide, alkali and alkaline earth borates, and mixtures thereof and
  wherein the additive remains in a mixture with the finely comminuted glass fibers.

2. The process according to claim 1, wherein said coarsely comminuting consists of 2 steps.

3. The process according to claim 1, wherein said coarsely comminuting is performed by means of a cutting mill, a guillotine cutter, an attrition wheel, a toothed roller mill, a hammermill, a pinned disk mill, an impact mill, or a combination.

4. The process according to claim 1, wherein said finely comminuting is performed in a mill.

5. The process according to claim 4,
 wherein said mill is a media mill using grinding media,
 wherein said media mill is selected from the group consisting of a ball mill, a tumbling mill, a drum mill, and a tube mill, and
 wherein the grinding media are subsequently separated out.

6. The process according to claim 1, wherein coarsely comminuted glass fibers having a length of from 5 to 50 mm are obtained in process step a).

7. The process according to claim 1, wherein said coarsely comminuted glass fibers have a residual moisture content of <5% by weight.

8. The process according to claim 1, wherein finely comminuted glass fibers having a length of <2 mm are obtained in step b).

9. The process according to claim 1, wherein the mixture of finely comminuted glass fibers and additive is subjected to sifting.

10. The process according to claim 1, wherein the mixing ratio of glass fibers to additive is from 30/70 to 80/20 by weight.

11. The process according to claim 1, wherein the additive has a d50 value within a range of from 0.1 to 1.5 mm.

12. The process according to claim 1, wherein said coarsely comminuting consists of more than 3 steps.

13. The process according to claim 1, wherein coarsely comminuted glass fibers having a length of from 10 to 20 mm are obtained in process step a).

14. The process according to claim 1, wherein said coarsely comminuted glass fibers have a residual moisture content of <2.5% by weight.

15. The process according to claim 1, wherein finely comminuted glass fibers having a length of <1 mm are obtained in step b).

16. The process according to claim 1, wherein the mixing ratio of glass fibers to additive is from 40/60 to 70/30 by weight.

17. The process according to claim 1, wherein the mixing ratio of glass fibers to additive is from 40/60 to 60/40 by weight.

18. The process according to claim 1, wherein the mixing ratio of glass fibers to additive is from 45/55 to 55/45 by weight.

19. The process according to claim 1, wherein the additive has a d50 value within a range of from 0.3 to 1.0 mm.

* * * * *